United States Patent
Machida

(10) Patent No.: US 7,297,925 B2
(45) Date of Patent: Nov. 20, 2007

(54) PHOTOELECTRIC CONVERSION DEVICE HAVING HOLDING CIRCUITS FOR TEMPORARILY HOLDING THE READOUTS FROM AMPLIFICATION CIRCUITS

(75) Inventor: Satoshi Machida, Chiba (JP)

(73) Assignee: Seiko Instruments Inc. (JP)

( * ) Notice: Subject to any disclaimer, the term of this patent is extended or adjusted under 35 U.S.C. 154(b) by 19 days.

(21) Appl. No.: 11/362,609

(22) Filed: Feb. 27, 2006

(65) Prior Publication Data
US 2006/0193016 A1   Aug. 31, 2006

(30) Foreign Application Priority Data
Feb. 28, 2005   (JP)   ............... 2005-054177

(51) Int. Cl.
*H01J 40/14*   (2006.01)
(52) U.S. Cl. ............... 250/214 R; 250/208.1
(58) Field of Classification Search ............ 250/214 R, 250/208.1, 214 LS, 214 LA, 214 A; 358/482, 358/486; 348/294, 300, 301, 314; 257/291
See application file for complete search history.

(56) References Cited

U.S. PATENT DOCUMENTS 4,617,471 A * 10/1986 Suzuki et al. ............... 358/482

\* cited by examiner

*Primary Examiner*—Que T Le
(74) *Attorney, Agent, or Firm*—Adams & Wilks

(57) ABSTRACT

To provide a photoelectric conversion device with low noise at low cost. The photoelectric conversion device includes: a plurality of photoelectric conversion circuits whose output potentials change according to an amount of incident light; a plurality of reset circuits each connected to an output of each of the photoelectric conversion circuits; a plurality of amplification circuits for amplifying the output potentials of the photoelectric conversion circuits, the amplification circuits each being connected to the output of each of the photoelectric conversion circuits; a plurality of signal read circuits for reading the outputs from the amplification circuits; and a plurality of holding circuits for temporarily holding the read outputs from the amplification circuits.

3 Claims, 9 Drawing Sheets

PHOTOELECTRIC CONVERSION DEVICE HAVING HOLDING CIRCUITS FOR TEMPORARILY HOLDING THE READOUTS FROM AMPLIFICATION CIRCUITS

BACKGROUND OF THE INVENTION

1. Field of the Invention

The present invention relates to a photoelectric conversion device for converting an optical signal into an electric signal, and more particularly, to an image sensor IC which is a photoelectric conversion device to be applied to an image reader such as a facsimile machine or an image scanner, and a contact image sensor having one or more of the image sensor IC.

2. Description of the Related Art

Up to now, improvements have been made on a photoelectric conversion device in terms of enhancement of sensitivity and a reduction of random noise.

In order to eliminate reset noise by virtue of a circuit, as shown in FIG. 15, there has been an attempt to offset the reset noise by disposing a noise signal holding circuit.

However, according to such the conventional photoelectric conversion device, the noise signal holding circuits must be provided as many as light receiving elements, which increases a chip area. Also, in order to enhance the sensitivity of the light receiving elements, it is necessary to increase the amplification factor of a downstream signal processor circuit. However, thermal noise of the circuits other than the reset circuit is also amplified at the same time. Therefore, it is difficult to obtain the high sensitivity/noise ratio. In particular, the signal processor circuit must operate at a high-frequency read frequency, normally at the frequency of 5 MHz or higher. In this case, the noise of a high frequency band is also amplified, making it difficult to attain the high sensitivity/noise ratio.

SUMMARY OF THE INVENTION

In order to solve the above-mentioned problems, the present invention provides a photoelectric conversion device, including: a plurality of photoelectric conversion circuits whose output potentials change according to an amount of incident light; a plurality of reset circuits each connected to an output of each of the photoelectric conversion circuits; a plurality of amplification circuits for amplifying the output potentials of the photoelectric conversion circuits, the amplification circuits each being connected to the outputs of the respective photoelectric conversion circuits; a plurality of signal read circuits for reading the outputs from the amplification circuits; and a plurality of holding circuits for temporarily holding the read outputs from the amplification circuits, in which the plurality of amplification circuits is noninverting amplification circuits.

Further, each of the noninverting amplification circuits includes: an operational amplifier; a capacitor disposed between an input terminal of the operational amplifier and a fixed potential; a capacitor disposed between the input terminal of the operational amplifier and an output of the operational amplifier; and a switch circuit disposed between the input terminal of the operational amplifier and the output of the operational amplifier, in which the signal read circuits are turned on when the switch circuit is turned off.

Also, in a photoelectric conversion device for sequentially reading output signals from plural photoelectric conversion circuits to a common signal line, the common signal line is reset to a given potential, a predetermined potential is common to the potential of a reference voltage terminal, the photoelectric conversion device incorporates a signal processor circuit having the common signal line inputted thereto, and a reference voltage of the signal processor circuit is electrically connected to a reference voltage terminal.

Also, an image sensor includes the plurality of photoelectric conversion devices, in which the reference voltage terminals are electrically connected to one another.

Also, a photoelectric conversion device for sequentially reading output signals from a plurality of photoelectric conversion circuits to a common signal line, in which the common signal line is reset to a given potential in a posterior half of a period during which signals are read from respective light receiving elements, the photoelectric conversion device incorporates a signal processing circuit having the common signal line inputted thereto, the signal processing circuit includes a clamp circuit, and the clamp circuit is fixed to the given potential in the posterior half of the period during which the signals are read from respective light receiving elements.

According to the photoelectric conversion device, the signal is amplified by plural amplifier circuits which are connected to the outputs of the photoelectric conversion circuits and amplify the output potentials of the photoelectric conversion circuits, while the operating speed of the amplifier circuits remains low. Accordingly, the noise of a high frequency band can be cut out, and the signal can be amplified with low noise. In addition, the amplification factor of the signal processor circuit that requires the high speed operation can be set to be low because the signal is amplified upstream, which makes it possible to reduce the noise of the output signal. From the above fact, it is possible to obtain the photoelectric conversion device with the high sensitivity/noise ratio at low cost, without using the noise signal holding circuit.

DETAILED DESCRIPTION OF THE PREFERRED EMBODIMENTS

Now, a description will be given in more detail of preferred embodiments of the present invention with reference to the accompanying drawings.

First Embodiment

Figure 1:
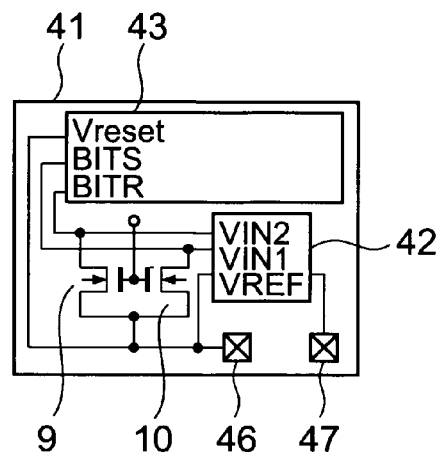
FIG. 1 is a schematic diagram showing an image sensor IC according to an embodiment of the present invention.

FIG. 1 is a schematic diagram showing an image sensor IC constituting a photoelectric conversion device of the present invention. The image sensor IC 41 is constructed of a signal processor circuit 42, a photoelectric conversion block 43, a reference voltage terminal 46, and a signal output terminal 47. Two common signal lines of the photoelectric conversion block 43 are inputted to the signal processor circuit 42, and an output of the photoelectric conversion circuit 42 is connected to the signal output terminal 47. Those two common signal lines are reset to a voltage of the reference voltage terminal 46 by two reset switches 9 and 10. The reference voltage terminal 46 is connected to the sources of the two reset switches 9 and 10, a reference voltage VREF of the signal processor circuit 42, and a reset voltage Vreset of the photoelectric conversion block 43. The reset voltage Vreset of the photoelectric conversion block 43 may be a voltage source inside of the IC.

Figure 2:
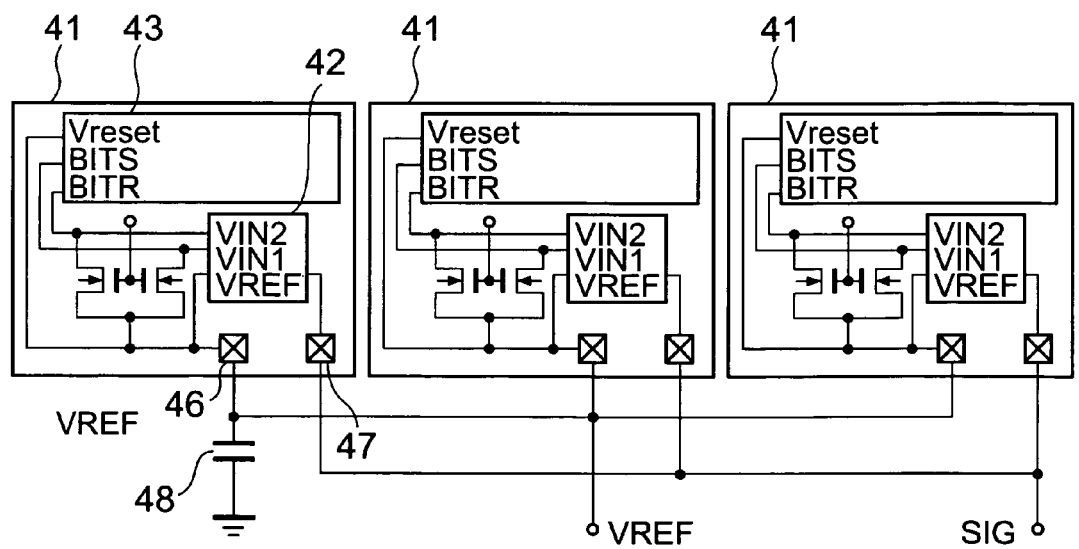
FIG. 2 is a schematic diagram showing a contact image sensor according to an embodiment of the present invention.

FIG. 2 is a schematic diagram showing a contact image sensor composed of the image sensor IC 41 shown in FIG. 1. The contact image sensor is constructed of three image sensors IC 41. The signal output terminals 47 of all of the image sensors IC 41 are connected to one another externally. Also, the reference voltage terminals 46 of all of the image sensors IC 41 are connected to one another externally, and a capacitor 48 is connected between the reference voltage terminals 46 and a ground (GND). The capacitor 48 is disposed in order to stabilize the potential of the reference voltage terminals 46, and has a capacity of about 1 uF to 100 uF. Also, a voltage may be supplied to the reference voltage terminals 46 from an external voltage source which is connected to a VREF terminal of FIG. 2, or may be supplied from voltage sources inside of the image sensors IC.

The potentials of the respective reference voltage terminals 46 are stabilized by the capacitor 48, which also makes the potentials of all of the chips to be equal. As a result, the reset of the common signal lines and the operation of the signal processor circuit 42 can be stabilized.

Figure 6:
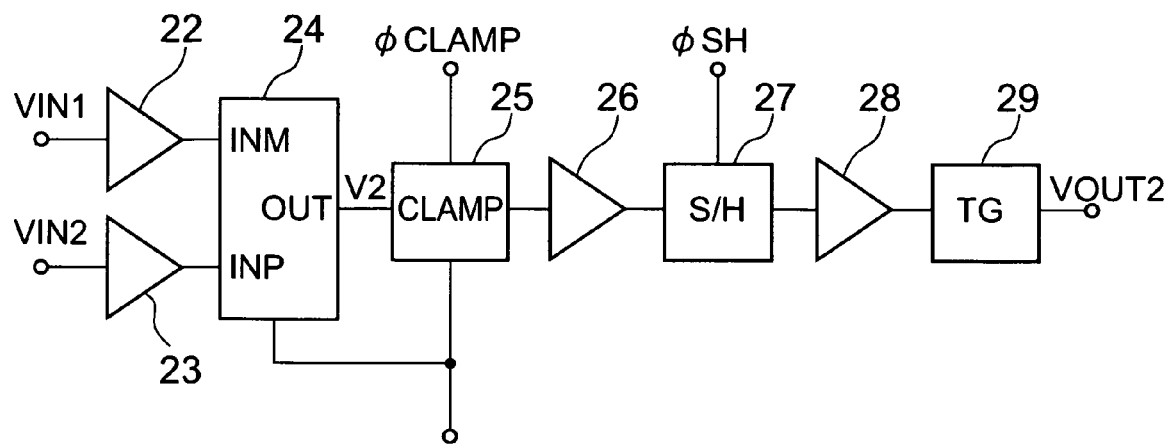
FIG. 6 is a block diagram showing a signal processor circuit according to an embodiment of the present invention.

FIG. 6 is a block diagram showing the signal processor circuit 42 according to an embodiment of the present invention. Signals inputted to input terminals VIN1 and VIN2 are inputted to a subtractor 24 through buffer amplifiers 22 and 23, respectively. An output of the subtractor 24 is inputted to a clamp circuit 25. The subtractor 24 and the clamp circuit 25 may have the reference voltage common to each other, and are connected to a VREF terminal. An output of the clamp circuit 25 is inputted to a buffer amplifier 26. The buffer amplifier 26 may be replaced with an amplifier circuit. In addition, the reference voltage of the amplifier circuit may be made common to that of the VREF terminal. An output of the buffer amplifier 26 is inputted to a sample and hold circuit 27. An output of the sample and hold circuit 27 is inputted to a buffer amplifier 28. An output of the buffer amplifier 28 is inputted to a transmission gate 29. An output of the transmission gate 29 is connected to an output terminal VOUT2. The transmission gate 29 may be unnecessary depending on a purpose of use.

Figure 7:
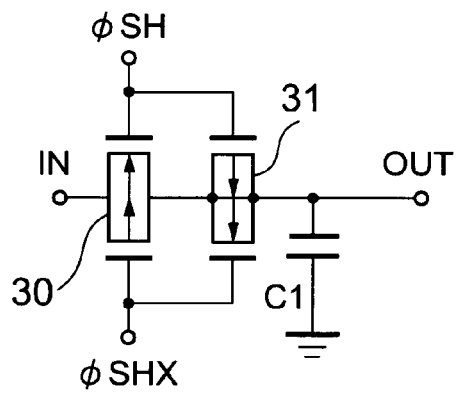
FIG. 7 is a circuit diagram showing a sample and hold circuit according to an embodiment of the present invention.

FIG. 7 is a circuit diagram showing a sample and hold circuit according to an embodiment of the present invention, which can be used for the sample and hold circuit 27. The sample and hold circuit is constructed of a transmission gate 30, a dummy switch 31, and a capacitor C1. In the sample and hold circuit, the transistor sizes of an NMOS and a PMOS of the transmission gate 30 are made identical with each other and the gate areas of the transistors of an NMOS and PMOS of the dummy switch 31 are made half of the gate area of the transistor of the transmission gate to thereby offset the noises of pulses of ΦSH and ΦSHX, which is inversion of ΦSH, with each other.

Figure 8:
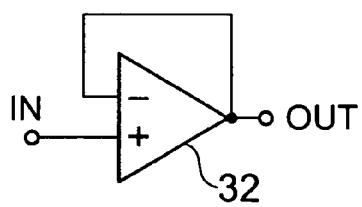
FIG. 8 is a circuit diagram showing a buffer circuit according to an embodiment of the present invention.

FIG. 8 is a circuit diagram showing a buffer amplifier according to an embodiment of the present invention, which is constructed of an operational amplifier 32. This circuit can be applied to the buffer amplifiers 22, 23, 26, and 28. The buffer amplifiers may be formed of source follower amplifiers.

Figure 9:
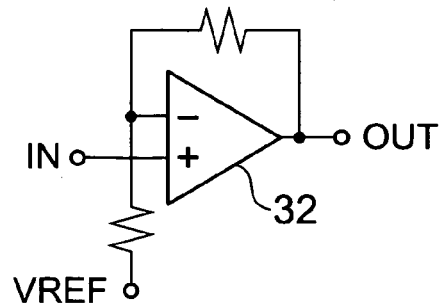
FIG. 9 is a circuit diagram showing an amplifier circuit according to an embodiment of the present invention.

FIG. 9 is a circuit diagram showing an amplifier circuit according to an embodiment of the present invention, which is constructed of an operational amplifier 32 and a resistor. Using this circuit instead of the buffer amplifier 26 makes it possible to increase the amplification factor of the signal processor circuit.

Figure 10:
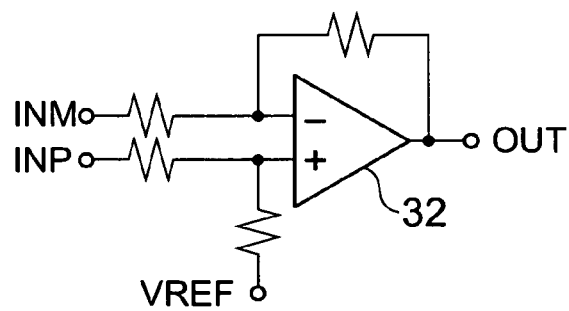
FIG. 10 is a circuit diagram showing a subtractor according to an embodiment of the present invention.

FIG. 10 is a circuit diagram showing a subtractor according to an embodiment of the present invention, which is constructed of an operational amplifier 32 and a resistor. In this circuit, a voltage obtained by subtracting the voltage of INM from the voltage of INP is multiplied by a gain that is determined by the ratio of the resistors, and then outputted with reference to the voltage of VREF. When the terminals are reversed to be inputted to INP and INM, the output can be inverted with reference to the voltage of VREF.

Figure 11:
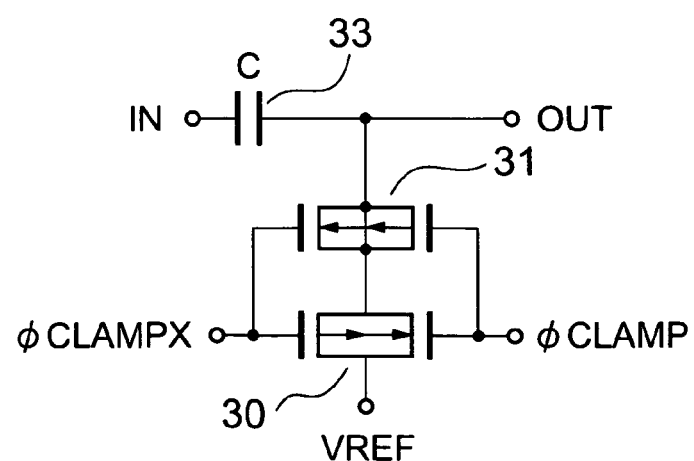
FIG. 11 is a circuit diagram showing a clamp circuit according to an embodiment of the present invention.

FIG. 11 is a circuit diagram showing a clamp circuit according to an embodiment of the present invention, which can be used for the clamp circuit 25. The clamp circuit is constructed of a transmission gate 30, a dummy switch 31, and a capacitor 33. The clamp circuit, the transistor sizes of an NMOS and a PMOS of the transmission gate 30 are made identical with each other and the gate areas of the transistors of an NMOS and PMOS of the dummy switch 31 are made half of the gate area of the transistor of the transmission gate to thereby offset the noises of pulses of ΦCLAMP and ΦCLAMPX, which is inversion of ΦCLAMP, with each other.

Figure 3:
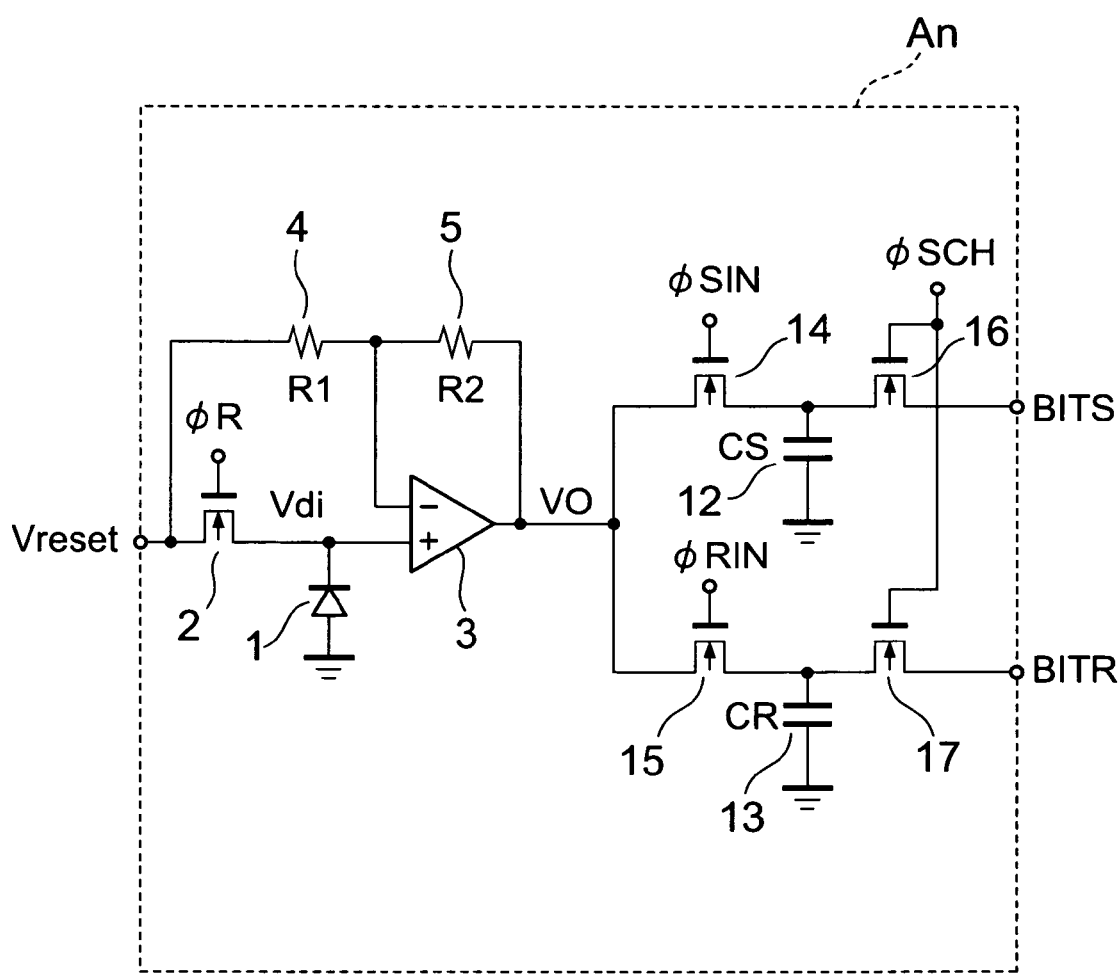
FIG. 3 is a schematic circuit diagram showing a photoelectric conversion block according to a first embodiment of the present invention.
Figure 5:
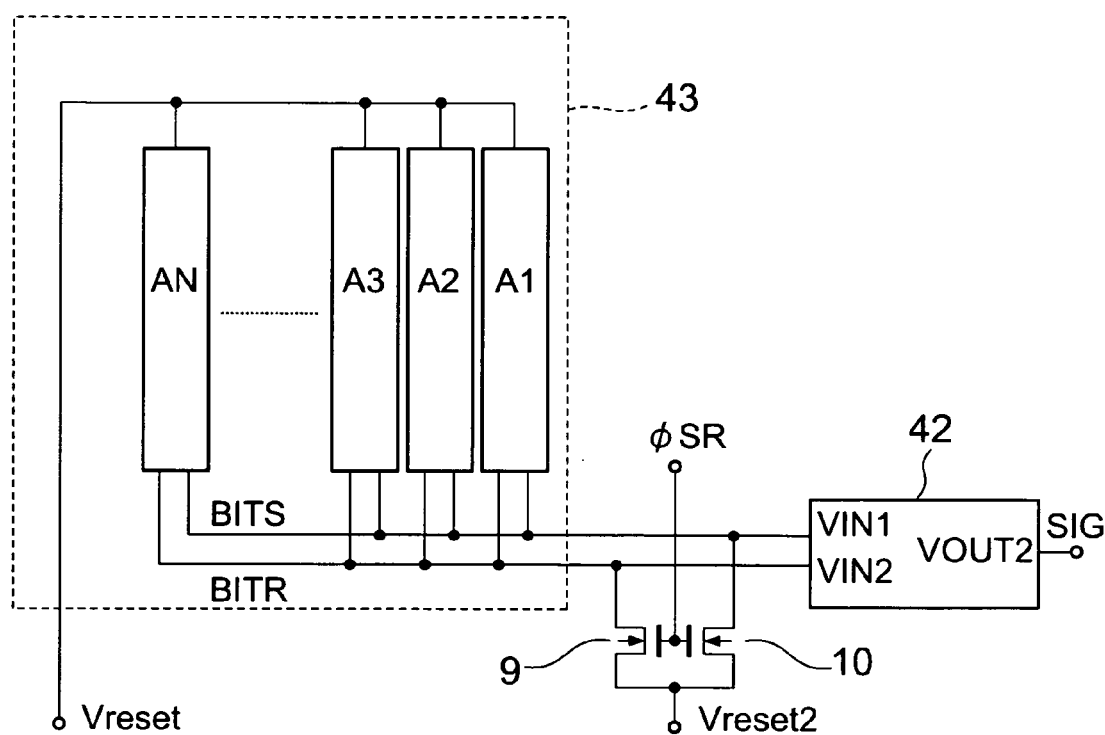
FIG. 5 is a structural diagram showing a photoelectric conversion block and a signal processor circuit according to an embodiment of the present invention.

FIG. 3 is a schematic circuit diagram showing one of the photoelectric conversion blocks An included in the photoelectric conversion block 43 according to the first embodiment of the present invention. The photoelectric conversion block 43 according to the embodiment of the present invention has photoelectric conversion blocks An (blocks within a frame) shown in FIG. 5, the number of which corresponds to the number of pixels, and represented by N. Each of the photoelectric conversion blocks An includes read switches 16 and 17 that are connected to common signal lines BITS and BITR. The photoelectric conversion block An indicates a photoelectric conversion block of an n-th bit. FIG. 5 is a structural diagram showing the photoelectric conversion block 43 and the signal processor circuit 42.

This circuit includes: a photodiode 1 that is a photoelectric conversion circuit; transfer switches 14, 15, 16, and 17 that form a signal read circuit; a reset switch 2 that is a reset circuit; a noninverting amplifier that is constructed of resistors 4, 5 and an operational amplifier 3; a capacitor 12 that holds an optical signal, a capacitor 13 that holds a reference signal that is a reference of the photoelectric conversion circuit; common signal lines BITS and BITR; common signal line reset switches 9 and 10; and a signal processor circuit 42. The capacitances CS and CR of the capacitors 12 and 13 are normally set to the same magnitude.

As shown in FIG. 5, one of the terminals of the reset switch 2 is connected to a Vreset terminal, which is common to all of the photoelectric conversion blocks An.

The photoelectric conversion block and the signal processor circuit can be formed on one semiconductor substrate.

Figure 12:
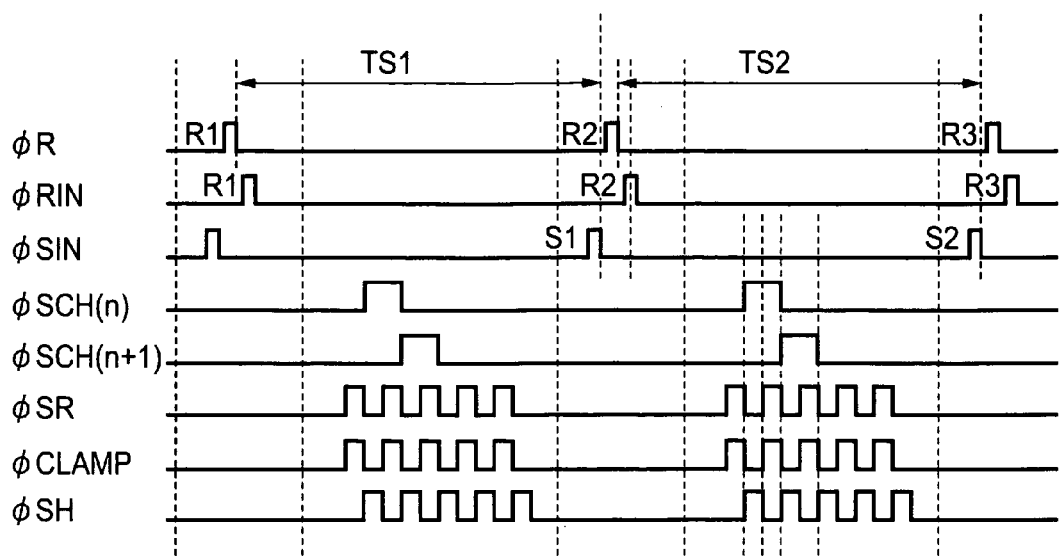
FIG. 12 is a timing chart showing a method of operation of the photoelectric conversion block and the signal processor circuit according to the first embodiment of the present invention.

FIG. 12 is a timing chart showing a method of operation of the photoelectric conversion block 43 and the signal processor circuit 42 according to an embodiment of the present invention. In the operation of the image sensor IC 41 according to the present invention, the initialization of all of the photoelectric conversion blocks An and the photoelectric charge storage operation are conducted simultaneously at certain timings. A photo generation carrier Qp of an n-th bit stored by the photoelectric charge storage operation at a first timing TS1 are assumed to be Qp1n. At a second timing TS2, all the photoelectric conversion blocks An store new photo generation carriers Qp2n, and at the same time, the photo generation carriers Qp1n of from the first bit to the final bit which are stored at the first timing TS1 are sequentially outputted one by one from an image sensor IC41 through the signal processor circuit 42. In other words, ΦR, ΦRIN, and ΦSIN in FIG. 12 are operated at the same time with respect to all the photoelectric conversion blocks An (hereinafter the photoelectric conversion block may be called "bit"). On the other hand, ΦSCH is different in the timing that is operated by the bit, and is indicated with (n).

First, the operation of the photoelectric conversion block of the n-th bit will be described.

When an initialization switch 2 is turned on by a pulse R1 of ΦR, an output terminal Vdi of the photodiode 1 is fixed to the reference voltage Vreset, and when the initialization switch 2 is turned off, the output terminal Vdi becomes a value obtained by adding an off noise Voff to the voltage Vreset of Vdi. Immediately after the initialization switch 2 is turned off, a transfer switch 15 is turned on by a pulse of the position of R1 of ΦRIN, and a reference signal after initialization of the photodiode 1 is read to the capacitor 13. The voltage V(REF) is represented as follows when the offset of the operational amplifier 3 is ignored, and the reset voltage is set to Vreset:

$$V(REF) = VRESET - Voff(R1+R2)/R2$$

where the resistances of the resistors 4 and 5 are R1 and R2, respectively.

Next, in the photoelectric charge storage operation at the first timing TS1, the photoelectric charges that have been captured by the photodiode 1 are stored. The photoelectric charges are stored in the photodiode 1, and the potential of Vdi changes according to the amount of photoelectric charges. The storage period is from the end of the pulse R1 of ΦR to the end of the pulse S1 of ΦSIN in a succeeding cycle, which corresponds to a period of the first timing TS1 shown in FIG. 12, and the same periods are set for all of the bits.

The transfer switch 14 is turned on by the pulse S1 of ΦSIN to read the output voltage corresponding to the photo generation carriers Qp that are obtained after the photoelectric charges captured by the photodiode 1 are stored. The output voltage is read to the capacitor 12.

When it is assumed that a variable of the potential of Vdi during TS1 is ΔVdi, the voltage V(SIG) that is read to the capacitor 12 is represented as follows:

$$V(SIG) = VRESET - Voff(R1+R2)/R1 - \Delta Vdi(R1+R2)/R1$$
$$= V(REF) - \Delta Vdi(R1+R2)/R1$$

That is, a change in the potential of the photodiode 1 can be obtained by timing (R1+R2)/R1. The amplification factor of the noninverting amplifier is normally set to about 2 times to 20 times.

Also, a high period of ΦR, ΦRIN, and ΦSIN that can be set to a relatively long period of time allows the through rate of the noninverting amplifier to be set to be small. For this reason, the components of the high band of noises of the noninverting amplifier do not affect the output. Accordingly, the noises can be reduced.

Subsequently, a succeeding storage operation is repeated after repeating the initialization, prior to the photoelectric charge storage operation at the second timing TS2.

Then, the operation of reading the reference signal and the optical signal will be described. The transfer switches 16 and 17 are turned on by the pulse of ΦSCH(n) at the same time during the storage period of TS2 in FIG. 12 to read the optical signal and the reference signal which have been held by the capacitors 12 and 13, to the common signal line BITS and the common signal line BITR, respectively.

A difference between the optical signal and the reference signal is taken in the signal processor circuit 42 described below, so that voltage difference caused by light can be taken.

Then, during a posterior half of the pulse of ΦSCH(n), the common signal line reset switches 9 and 10 are turned on by the pulse of ΦSR to initialize the common signal line BITS and the common signal line BITR to the voltage of Vreset2. As shown in FIG. 2, when Vreset2 is connected to VREF, the common signal line BITS and the common signal line BITR are initialized to the voltage of VREF. At this time, VREF is stabilized by an external large capacitor 48, which allows the common signal line BITS and the common signal line BITR to be surely initialized to a constant voltage of VREF.

Subsequently, when the transfer switches 16 and 17 of the subsequent bit are turned on by ΦSCH(n+1) after turning off the transfer switches 16 and 17 of the n-th bit by ΦSCH(n), the optical signal and the reference signal of the subsequent bit start to be read.

In the following description, for convenience, a first half of the high period of ΦSCH(n) during which the optical signal and the reference signal are read to the common signal line BITS and the common signal line BITR is referred to as anterior half period, and a latter half period of the high period of ΦSCH(n) during which the common signal line BITS and the common signal line BITR are initialized to the voltage of VREF is referred to as posterior half period.

Next, the operation of the signal processor circuit 42 will be described. The VIN1 terminal and the VIN2 terminal are connected with the common signal line BITS and the common signal line BITR, respectively. During the anterior half period, the optical signal and the reference signal are inputted to the subtractor through the buffer amplifiers 22 and 23. During the posterior half period, the voltage of VREF is inputted to the subtractor through the buffer amplifiers 22 and 23. Accordingly, in the anterior half period, the output of the subtractor becomes a level resulting from adding a VREF level to a level obtained by multiplying the difference between the optical signal and the reference signal by the gain times. In the posterior half period, the output of the subtractor becomes a level of VREF. Also, the levels in both of the anterior half period and the posterior half period are effected by the offset of the buffer amplifiers 22, 23, and the subtractor 24.

A clamp pulse ΦCLAMP is so added as to be on in the posterior half period and off in the anterior half period. As a result, an output of the clamp circuit 25 is clamped to a VREF level each time in the posterior half period. Accordingly, the output of the clamp circuit 25 in the anterior half period becomes a level resulting from adding the VREF level to a level obtained by subtracting the posterior half output of the bit which is one bit before the anterior half output of the subtractor. As a result, the output of the clamp circuit in the anterior half period becomes a level resulting from adding VREF to the level obtained by multiplying a difference between the optical signal and the reference signal by the gain. These levels are not effected by the offset of the buffer amplifiers 22, 23, and the subtractor 24.

The sample and hold pulse ΦSH is so added to turn on in the anterior half period and to turn off in the posterior half period. Accordingly, the output in the anterior half period of the output after clamping is sampled and held in the posterior half period. Therefore, it is possible to maintain the output level for a long period of time.

Second Embodiment

Figure 4:
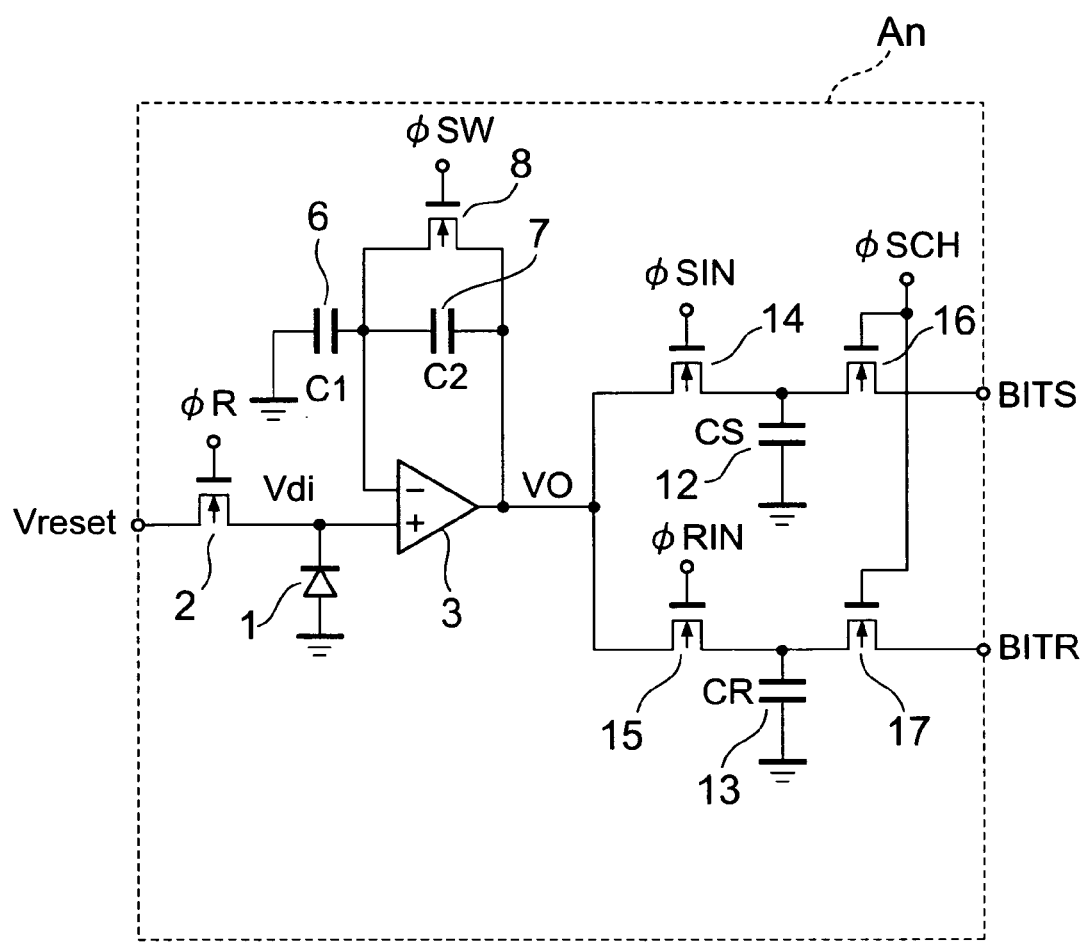
FIG. 4 is a schematic circuit diagram showing a photoelectric conversion block according to a second embodiment of the present invention.

FIG. 4 is a schematic circuit diagram showing a photoelectric conversion block An according to another embodiment of the present invention. Different from the photoelectric conversion block An shown in FIG. 3, the resistors 4 and 5 are replaced with capacitors 6 and 7, and a switch 8 is inserted between the input and the output of the operational amplifier 3. One terminal of the capacitor 6 is set to a ground (GND), but may be set to another potential if the potential is fixed. Other structures are identical with those in FIG. 3.

In the first embodiment, in order to reduce the current consumption, it is necessary to set the resistances R1 and R2 to be higher. To achieve this, a high resistant polysilicon is required, which increases the costs of the process. However, in the second embodiment, the high resistors are replaced with the capacitors to reduce the costs of the process.

Figure 13:
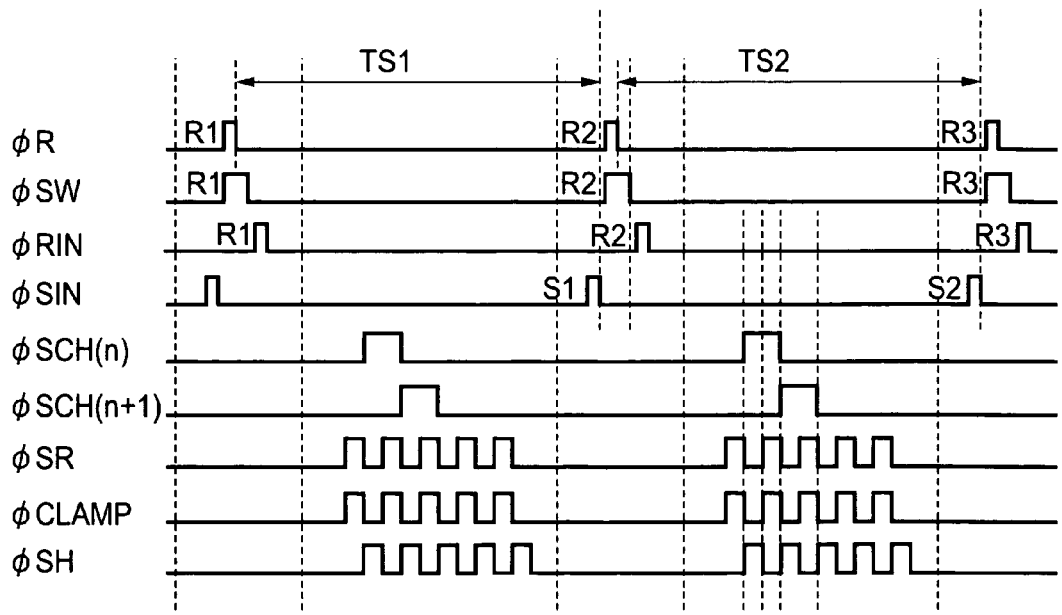
FIG. 13 is a timing chart showing a method of operation of the photoelectric conversion block and the signal processor circuit according to the second embodiment of the present invention.

FIG. 13 is a timing chart showing a method of operation of the photoelectric conversion block 43 and the signal processor circuit 42 according to the second embodiment of the present invention.

First, the operation of the n-th bit photoelectric conversion block will be described.

The initialization switch 2 and the switch 8 are turned on by the pulses R1 of ΦR and ΦSW to structure the operational amplifier 3 as a voltage follower amplifier. Accordingly, the output terminal Vdi of the photodiode 1 is fixed to the reference voltage Vreset, and the output of the operational amplifier 3 also becomes the reference voltage Vreset.

Subsequently, when the initialization switch 2 is turned off, the voltage becomes a value resulting from adding the off noise Voff to the voltage Vreset of Vdi. Then, the switch 8 is turned off.

Immediately after the switch 8 is turned off, the transfer switch 15 is turned on by the pulse of the position of R1 of ΦRIN to read the reference signal after the photodiode 1 has been initialized, to the capacitor 13. When the influences of the offset of the operational amplifier 3 and the off noise of the switch 8 are ignored, and the reset voltage is Vreset, the voltage V(REF) is represented as follows:

$$V(REF) = VRESET - Voff(C1+C2)/C2$$

where the capacitances of the capacitors 6 and 7 are C1 and C2, respectively.

Next, in the photoelectric charge storage operation at the first timing TS1, the photoelectric charges that have been captured by the photodiode 1 are stored. The photoelectric charges are stored in the photodiode 1, and the potential of Vdi changes according to the amount of photoelectric charges. The storage period is from the end of the pulse R1 of ΦR to the end of the pulse S1 of ΦSIN in a succeeding cycle, which corresponds to a period of the first timing TS1 shown in FIG. 12, and the same periods are set for all of the bits.

The transfer switch 14 is turned on by the pulse S1 of ΦSIN to read the output voltage according to the photo generation carriers Qp that are obtained after the photoelectric charges captured by the photodiode 1 are stored. The output voltage is read to the capacitor 12.

When it is assumed that a variable of the potential of Vdi during TS1 is ΔVdi, the voltage V(SIG) that is read to the capacitor 12 is represented as follows:

$$V(SIG) = VRESET - Voff(C1+C2)/R1 - \Delta Vdi(C1+C2)/C1$$
$$= V(REF) - \Delta Vdi(C1+C2)/C1$$

Subsequently, the succeeding storage operation is repeated after the initialization is repeated, prior to the photoelectric charge storage operation at a second timing TS2.

The reading operation of the reference signal and the optical signal and the subsequent operation are identical with those in the first embodiment, and their description will be omitted.

Third Embodiment

Figure 14:
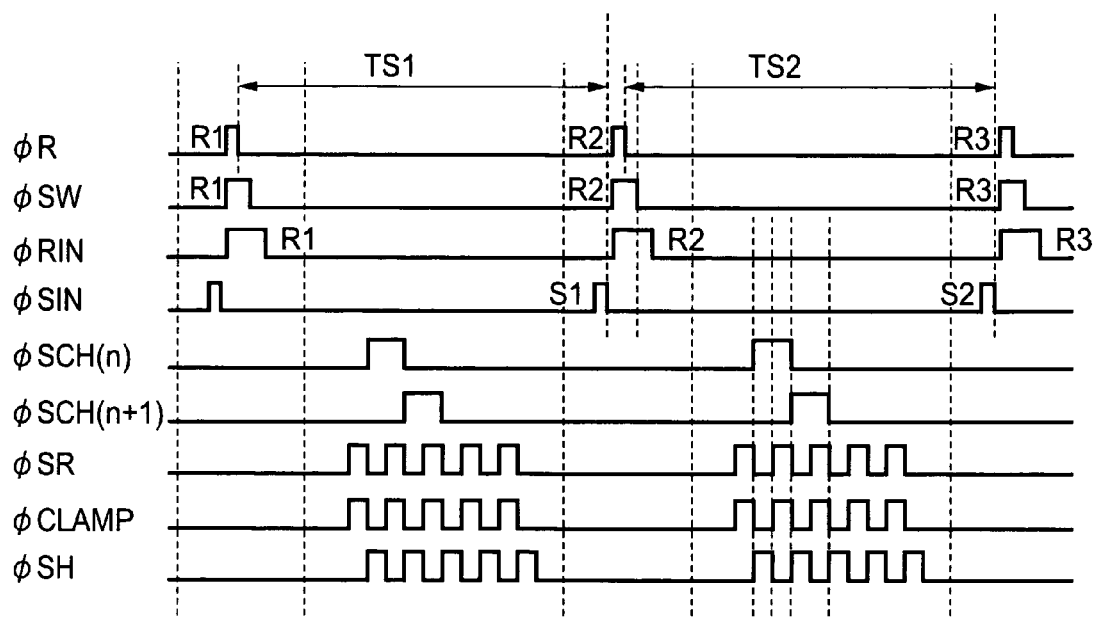
FIG. 14 is a timing chart showing a method of operation of the photoelectric conversion block and the signal processor circuit according to a third embodiment of the present invention.
Figure 15:
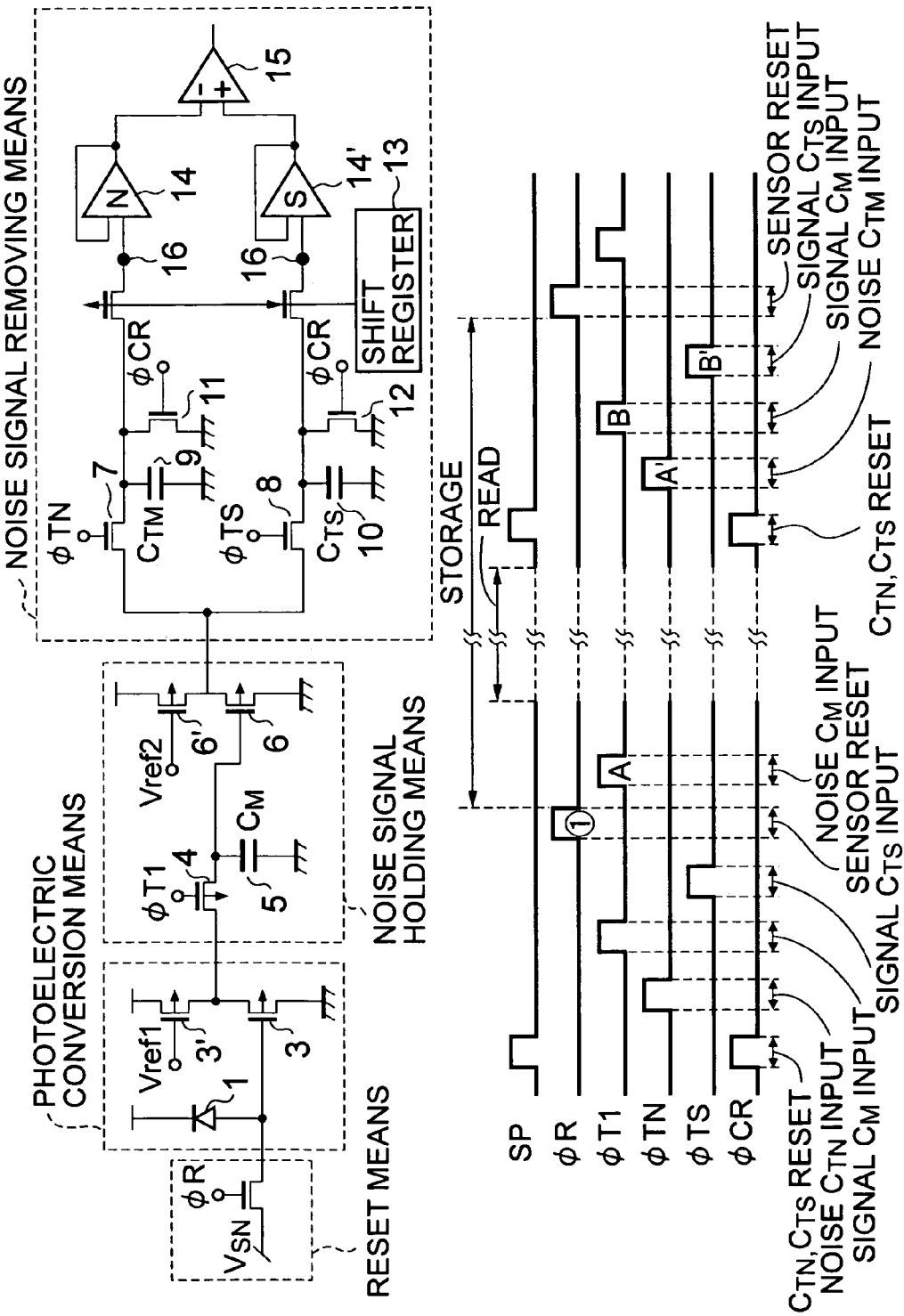
FIG. 15 is a circuit diagram and a timing chart according to a conventional photoelectric conversion device.

FIG. 14 is a timing chart showing another operating method according to a second embodiment. Different from the second embodiment, when the switch 8 turns off due to ΦSW, the switch 15 is in an on state by ΦRIN.

The noise of the switch 8 and the noise of the operational amplifier 3 are sampled and held to a terminal between the capacitors 6 and 8 when the switch 8 turns off, thereby causing the noises in the output. However, when the switch 8 turns off, the load capacitor of the VO terminal in FIG. 4 is increased, thereby making it possible to reduce the influence of those noises. Other operations are identical with those in the second embodiment.

In the above-mentioned embodiments, while the photodiode is conducting the storage operation in the TS2 period, it is possible to read the optical signal that has been stored in the previous storage period TS1. Accordingly, the LEDs of three colors of RGB are sequentially lighted to thereby read color image data. For example, it is possible that the red LED is lighted in the TS1 period to read the red component, the green LED is lighted in the TS2 period to read the green component, and the blue LED is lighted in the next TS2 period to read the blue component. In this case, the red optical signal is read within the TS2 period.

In the above description of the image sensor according to the present invention, the signal processor circuit 42 may not be incorporated in the IC.

The above description was mainly given of a linear image sensor IC, but the structures of FIGS. 3 and 4 can be applied to the area image sensor IC.

In the above description, the present invention is not limited to the above embodiments, but can be variously modified within a scope that does not deviate from the concept of the present invention.

What is claimed is:

1. A photoelectric conversion device, comprising:
   a plurality of photoelectric conversion circuits whose output potentials change according to an amount of incident light;
   a plurality of reset circuits each connected to an output of each of the photoelectric conversion circuits;
   a plurality of noninverting amplification circuits for amplifying the output potentials of the photoelectric conversion circuits, the noninverting amplification circuits each being connected to the output of each of the photoelectric conversion circuits;
   a plurality of signal read circuits for reading the outputs from the noninverting amplification circuits; and
   a plurality of holding circuits for temporarily holding the read outputs of the noninverting amplification circuits.

2. A photoelectric conversion device according to claim 1, wherein each of the noninverting amplification circuits comprises:
   an operational amplifier;
   a capacitor disposed between an input terminal of the operational amplifier and a fixed potential;
   a capacitor disposed between the input terminal of the operational amplifier and an output of the operational amplifier; and
   a switch circuit disposed between the input terminal of the operational amplifier and the output of the operational amplifier.

3. A photoelectric conversion device according to claim 2, wherein the signal read circuits are turned on when the switch circuit turns off.

* * * * *